(12) United States Patent
Andersson et al.

(10) Patent No.: US 10,954,911 B2
(45) Date of Patent: Mar. 23, 2021

(54) CONTROL AND COMMUNICATION MODULE FOR LIGHT-DUTY COMBUSTION ENGINE

(71) Applicant: Walbro LLC, Tucson, AZ (US)

(72) Inventors: Martin N. Andersson, Caro, MI (US); Cyrus M. Healy, Ubly, MI (US)

(73) Assignee: Walbro LLC, Tucson, AZ (US)

( * ) Notice: Subject to any disclaimer, the term of this patent is extended or adjusted under 35 U.S.C. 154(b) by 0 days.

(21) Appl. No.: 16/342,838

(22) PCT Filed: Oct. 19, 2017

(86) PCT No.: PCT/US2017/057320
§ 371 (c)(1),
(2) Date: Apr. 17, 2019

(87) PCT Pub. No.: WO2018/075732
PCT Pub. Date: Apr. 26, 2018

(65) Prior Publication Data
US 2019/0257280 A1    Aug. 22, 2019

Related U.S. Application Data

(60) Provisional application No. 62/409,897, filed on Oct. 19, 2016.

(51) Int. Cl.
*F02P 3/08* (2006.01)
*F02B 63/02* (2006.01)
(Continued)

(52) U.S. Cl.
CPC ............. *F02P 3/08* (2013.01); *F02B 63/02* (2013.01); *F02D 41/266* (2013.01); *F02D 41/28* (2013.01);
(Continued)

(58) Field of Classification Search
CPC .......... F02N 11/0807; F02N 2300/306; B60R 2325/101; B60R 2325/205
See application file for complete search history.

(56) References Cited

U.S. PATENT DOCUMENTS 3,824,429 A * 7/1974 Davalillo ............... F02P 1/086
315/209 R
4,413,261 A * 11/1983 Greenberg ............. F02P 11/04
290/38 C
(Continued)

FOREIGN PATENT DOCUMENTS

CN         2257866 Y    7/1997
CN       101109336 A    1/2008
(Continued)

OTHER PUBLICATIONS

Written Opinion & International Search Report for PCT/US2017/057320 dated Dec. 26, 2017, 16 pages.
(Continued)

*Primary Examiner* — Kevin R Steckbauer
(74) *Attorney, Agent, or Firm* — Reising Ethington P.C.

(57) ABSTRACT

—In at least some implementations, a control and communication system for a light-duty combustion engine includes a circuit card, an ignition circuit carried by the circuit card and configured to control an ignition timing of the engine, and a short range wireless communication circuit carried by the circuit card. The communication circuit may include a Bluetooth Low Energy antenna. The ignition circuit may include an ignition capacitor that when drained induces an ignition pulse adapted to fire a spark plug. The system may further include a microprocessor that is coupled to and controls the ignition and communication circuits, and/or a clocking circuit adapted to provide a clocking frequency associated with the timing of the ignition circuit and asso-
(Continued)

ciated with the communication circuit via a short range wireless communication protocol. The clocking circuit may include a crystal oscillator.

17 Claims, 3 Drawing Sheets

(51) Int. Cl.
    *F02P 5/15*     (2006.01)
    *F02P 11/04*     (2006.01)
    *H04B 1/40*     (2015.01)
    *F02D 41/28*     (2006.01)
    *F02P 11/00*     (2006.01)
    *F02D 41/26*     (2006.01)
    *F02P 3/06*     (2006.01)
    *F02D 41/22*     (2006.01)
    *F02P 3/09*     (2006.01)

(52) U.S. Cl.
    CPC ............... *F02P 3/06* (2013.01); *F02P 5/1502* (2013.01); *F02P 11/00* (2013.01); *F02P 11/04* (2013.01); *H04B 1/40* (2013.01); *F02D 41/22* (2013.01); *F02P 3/0838* (2013.01); *F02P 3/0846* (2013.01); *F02P 3/0861* (2013.01); *F02P 3/0869* (2013.01); *F02P 3/0884* (2013.01); *F02P 3/093* (2013.01)

(56) References Cited

U.S. PATENT DOCUMENTS

| | | | |
|---|---|---|---|
| 4,996,464 A | | 2/1991 | Dodd et al. |
| 5,513,619 A | | 5/1996 | Chen et al. |
| 6,384,606 B1 | * | 5/2002 | Nussbaum ................ F02P 3/06 324/379 |
| 7,069,921 B1 | | 7/2006 | Kolak et al. |
| 7,448,358 B2 | | 11/2008 | Andersson et al. |
| 7,546,836 B2 | | 6/2009 | Andersson et al. |
| 9,466,198 B2 | * | 10/2016 | Burch ................... G06Q 10/087 |
| 9,949,075 B2 | * | 4/2018 | Burch ................... H04W 4/021 |
| 10,285,003 B2 | * | 5/2019 | Burch ....................... B25F 5/00 |
| 10,631,120 B2 | * | 4/2020 | Burch ................... G06Q 10/06 |
| 10,634,111 B2 | * | 4/2020 | Bykowski ............... F02D 41/04 |
| 10,685,299 B2 | * | 6/2020 | Mejegard ................ H04W 4/80 |
| 2006/0069495 A1 | | 3/2006 | Andersson et al. |
| 2009/0056685 A1 | | 3/2009 | Olsson |
| 2010/0206947 A1 | * | 8/2010 | Ellingsworth .......... B60R 25/21 235/375 |
| 2014/0240125 A1 | * | 8/2014 | Burch ................... G06Q 10/06 340/539.13 |
| 2015/0039269 A1 | * | 2/2015 | Mejegard ............... B60W 40/08 702/182 |
| 2017/0006420 A1 | * | 1/2017 | Burch ........................ G05F 1/66 |
| 2018/0160266 A1 | * | 6/2018 | Burch ................... G06Q 10/087 |
| 2018/0163689 A1 | * | 6/2018 | Bykowski ............... F02P 17/00 |
| 2019/0222957 A1 | * | 7/2019 | Burch ................ G08B 13/1427 |
| 2020/0090175 A1 | * | 3/2020 | Davis ....................... G06F 21/71 |

FOREIGN PATENT DOCUMENTS

| | | |
|---|---|---|
| CN | 105443260 A | 3/2016 |
| EP | 1985843 A2 | 10/2008 |
| SE | 1950023 A1 | 1/2019 |
| SE | 541796 C2 | 12/2019 |

OTHER PUBLICATIONS

Swedish Office Action for SE Application No. 1950481-0 dated Feb. 28, 2020 (8 pages).
Chinese Office Action for CN Application No. 201780064517.9 dated Oct. 9, 2020 (18 pages).

* cited by examiner

CONTROL AND COMMUNICATION MODULE FOR LIGHT-DUTY COMBUSTION ENGINE

REFERENCE TO RELATED APPLICATIONS

This application claims the benefit of U.S. Provisional Application Ser. No. 62/409,897 filed on Oct. 19, 2016 the entire contents of which are incorporated herein by reference in its entirety.

TECHNICAL FIELD

The present disclosure relates generally to a control and communication module for a combustion engine.

BACKGROUND

Various ignition systems for light-duty combustion engines are known in the art and are used with a wide range of power tools, such as lawn equipment and chainsaws. Typically, these ignition systems do not have a battery, instead they rely upon a pull-rope recoil starter and a magneto-type system to provide electrical energy for ignition and to operate other electrical devices. In some devices, a computer may be connected by a wire to an electronic controller transfer information between the computer and controller. The interaction between a user of the power tool and the controller is limited or nonexistent, and no interface is provided for wireless communication with a mobile device of, for example the user (e.g. a mobile phone or the like).

SUMMARY

In at least some implementations, a control and communication system for a light-duty combustion engine includes a circuit card, an ignition circuit carried by the circuit card and configured to control an ignition timing of the engine, and a short range wireless communication circuit carried by the circuit card. The communication circuit may include a Bluetooth Low Energy antenna. The ignition circuit may include an ignition capacitor that when drained induces an ignition pulse adapted to fire a spark plug. The system may further include a microprocessor that is coupled to and controls the ignition and communication circuits, and/or a clocking circuit adapted to provide a clocking frequency associated with the timing of the ignition circuit and associated with the communication circuit via a short range wireless communication protocol. The clocking circuit may include a crystal oscillator.

In at least some implementations, a control and communication system for a light-duty combustion engine includes at least one microprocessor, a capacitive discharge ignition circuit communicated with the at least one microprocessor and configured to control an ignition timing of the engine and to provide energy used for ignition events, and a short range wireless communication circuit communicated with the at least one microprocessor to enable operation of the communication circuit. Both the ignition circuit and the communication circuit may be located on the same circuit board. Or the ignition circuit and communication circuit may be located on different circuit boards and at least one of the at least one microprocessor is on the same circuit board as either the ignition circuit or the communication circuit.

The at least one microprocessor may include a first microprocessor located on a first circuit board and a second microprocessor located on a second circuit board. The ignition circuit may be located on the first circuit board and communicated with and controlled by the first microprocessor, and the communication circuit may be located on the second circuit board and communicated with and controlled by the second microprocessor.

In at least some implementations, a computer program product, comprising a non-transitory computer readable medium for a mobile device, comprising one or more software programs stored on the computer readable medium that include program instructions to communicate with a power tool, the instructions may include instructions for establishing a short range wireless communication link between the mobile device and the power tool, and in response to the established link, providing a service via the mobile device. The service provided may include one or more of: transferring diagnostics data associated with the power tool; locking or unlocking functions of the power tool; adding or changing program instructions on the computer readable medium; and inhibiting operation of the power tool based on geographic location of the power tool.

BRIEF DESCRIPTION OF THE DRAWINGS

The following detailed description of certain embodiments and best mode will be set forth with reference to the accompanying drawings, in which.

DETAILED DESCRIPTION

Figure 1:
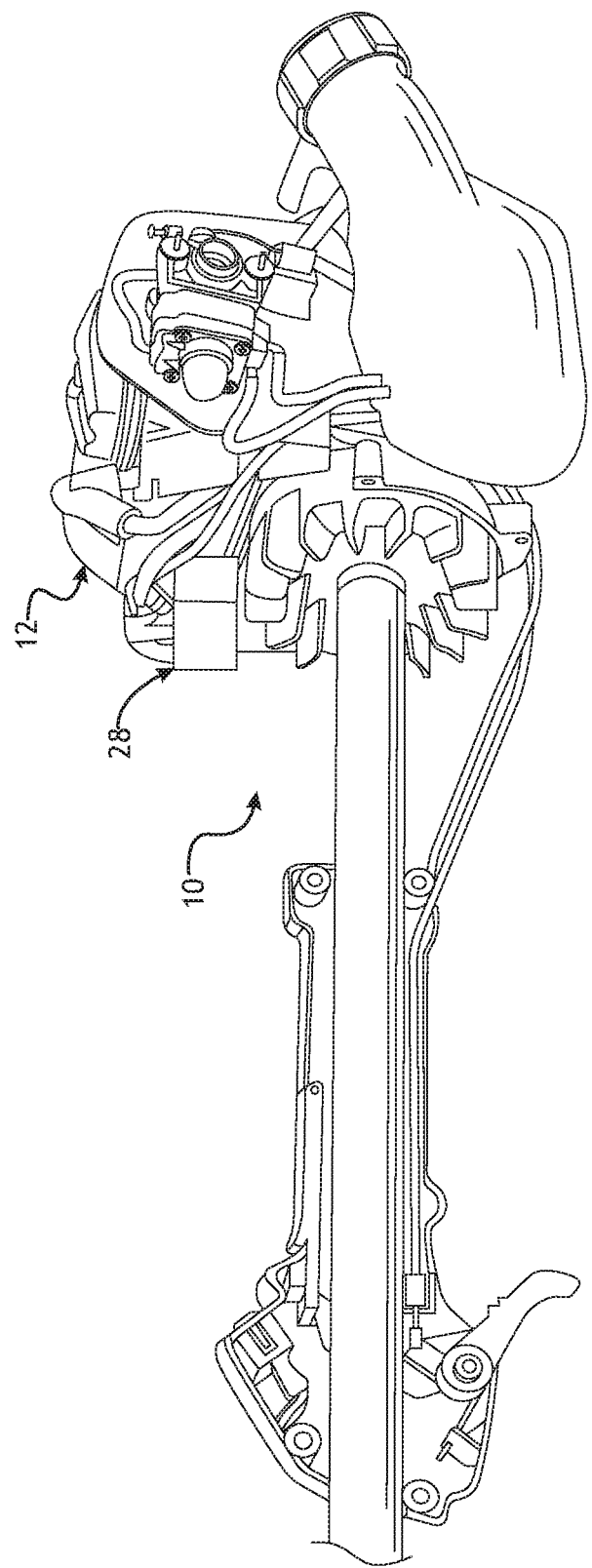
FIG. 1 is a perspective view of a weed trimmer including a small internal combustion engine and a control and communication module that is configured to control ignition events in the engine and wirelessly communicate with other devices.

Referring in more detail to the drawings, FIG. 1 illustrates an exemplary handheld power tool or product in the form of a weed trimmer 10 powered by a small or light-duty internal combustion engine 12. Typically, the engine is a single cylinder two-stroke or four-stroke gasoline powered internal combustion engine, however engines having more than one cylinder may be used. Typically, this engine 12 has a control and communication module 28 that supplies a high voltage ignition pulse to a spark plug for igniting an air and fuel mixture in the engine cylinder; e.g., this module 28 may vary and control the ignition timing in response to changing engine operating conditions. In addition, the module 28 may communicate with various other devices off-board (and/or on-board) the weed trimmer 10. For example, the module 28 may be configured to send and receive data wirelessly to a connected mobile device enabling the module 28 to participate in software downloads, diagnostic reporting, system configurations, and the like.

Typically, the engine 12 does not have any battery supplying an electric current to the spark plug or powering the control module 28. The engine 12 may be manually cranked for starting, such as with a recoil rope starter. The term "light-duty combustion engine" broadly includes all types of non-automotive combustion engines including two and four-stroke gasoline powered engines used in various products including portable electric generators, air compressors, water pumps, power washers, snow blowers, personal watercraft, boats, snowmobiles, motorcycles, all-terrain vehicles, lawn and garden equipment such as garden tractors, tillers, chainsaws, edgers, grass and weed trimmers, air blowers, leaf blowers, etc.

Figure 2:
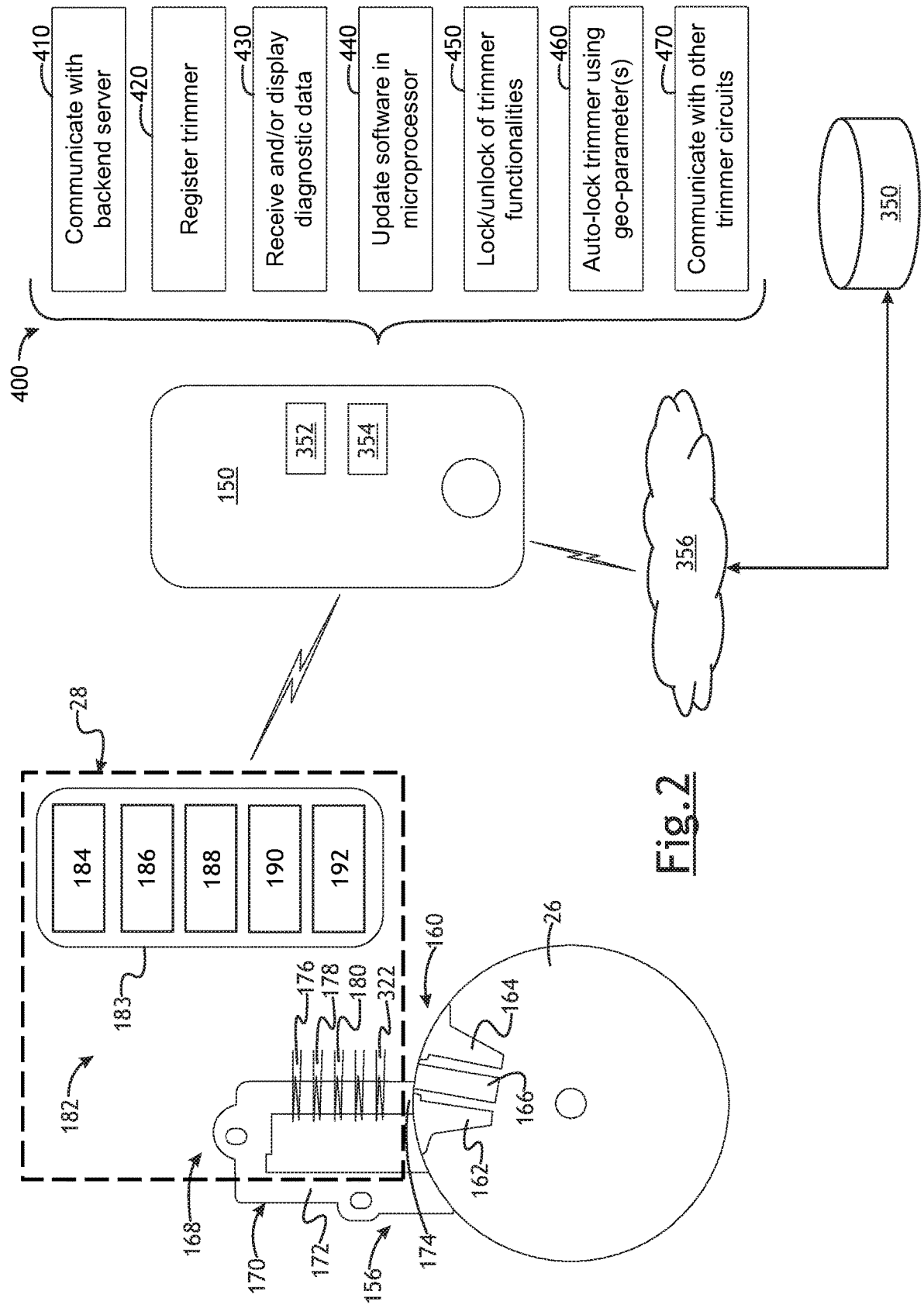
FIG. 2 is a schematic circuit diagram of a magneto-capacitive discharge ignition system which may be used to power the control and communication module shown in FIG. 1 and also a mobile device capable of communicating with the control and communication module.

FIG. 2 schematically illustrates the control and communication module 28 coupled to a magneto system 156 used to provide electric current to fire the spark plug, as well as to supply power for wireless communications. This magneto system includes a permanent magnet element 160 with pole shoes 162, 164 and a permanent magnet 166 mounted on a flywheel 26 such that when rotating it induces a magnetic flux in a nearby stator assembly 168 of the module 28 as the magnet element passes thereby.

The stator assembly 168 may include a lamstack 170 having a first leg 172 and a second leg 174 (separated from the rotating flywheel 26 by a relatively small and measured air gap which may be about 0.3 mm), a charge coil winding 176, an ignition primary coil winding 178 and a secondary coil winding 180 which may all be wrapped around a single leg of the lamstack. The lamstack 170 may be a generally U-shaped ferrous armature made from a stack of iron plates and may be in a module housing located on the engine. The ignition primary and secondary coil windings 178, 180 may provide a step-up transformer and as is well known by those skilled in the art, the primary winding 178 may have a comparatively few turns of a relatively heavy gauge wire, while the secondary ignition coil winding 180 may have many turns of a relatively fine wire. The ratio of turns between the primary and secondary ignition windings generates a high voltage potential in the secondary winding that is used to fire a spark plug of the engine to provide an electric arc or spark and consequently ignite an air-fuel mixture in the engine combustion chamber (not shown). Of course, the illustrated lamstack 170 is merely one implementation; e.g., in other embodiments, one or more of the illustrated coils could be arranged around the first leg 172 instead, and other legs and coils may be provided as desired.

As shown in FIG. 2, the control and communication module 28 may include a control and communication circuit 182 on a printed circuit board or circuit card 183. In at least one embodiment, the circuit card 183 is relatively small; e.g., less than 2"×2". And in at least one embodiment, the circuit card may be approximately 1.0"×1.5". The circuit 182 may include a microprocessor or microcontroller 184, a capacitive discharge ignition (CDI) circuit 186 (e.g., charged by the positive portion of an AC signal generated by the magneto system 156 described above), a power circuit 188, a short range wireless communication circuit 190 for communicating with an off-board mobile device 150, and a clocking circuit 192 adapted to improve the timing (e.g., frequency integrity) of both the ignition circuit 186 and the wireless communication circuit 190—the power circuit 188 powering at least microprocessor 184 and communication circuit 190 using the negative portion of the AC signal generated by the magneto system 156. In at least one embodiment, the circuits 186-192 are located on a common side or face of the circuit card 183. As will be discussed below, the control and communication circuit 182 may be functional even though the CDI circuit 186 (generating undesirable radio frequency noise) and short range wireless communication circuit 190 (communicating using radio frequencies) are relatively close to one another.

Figure 3:
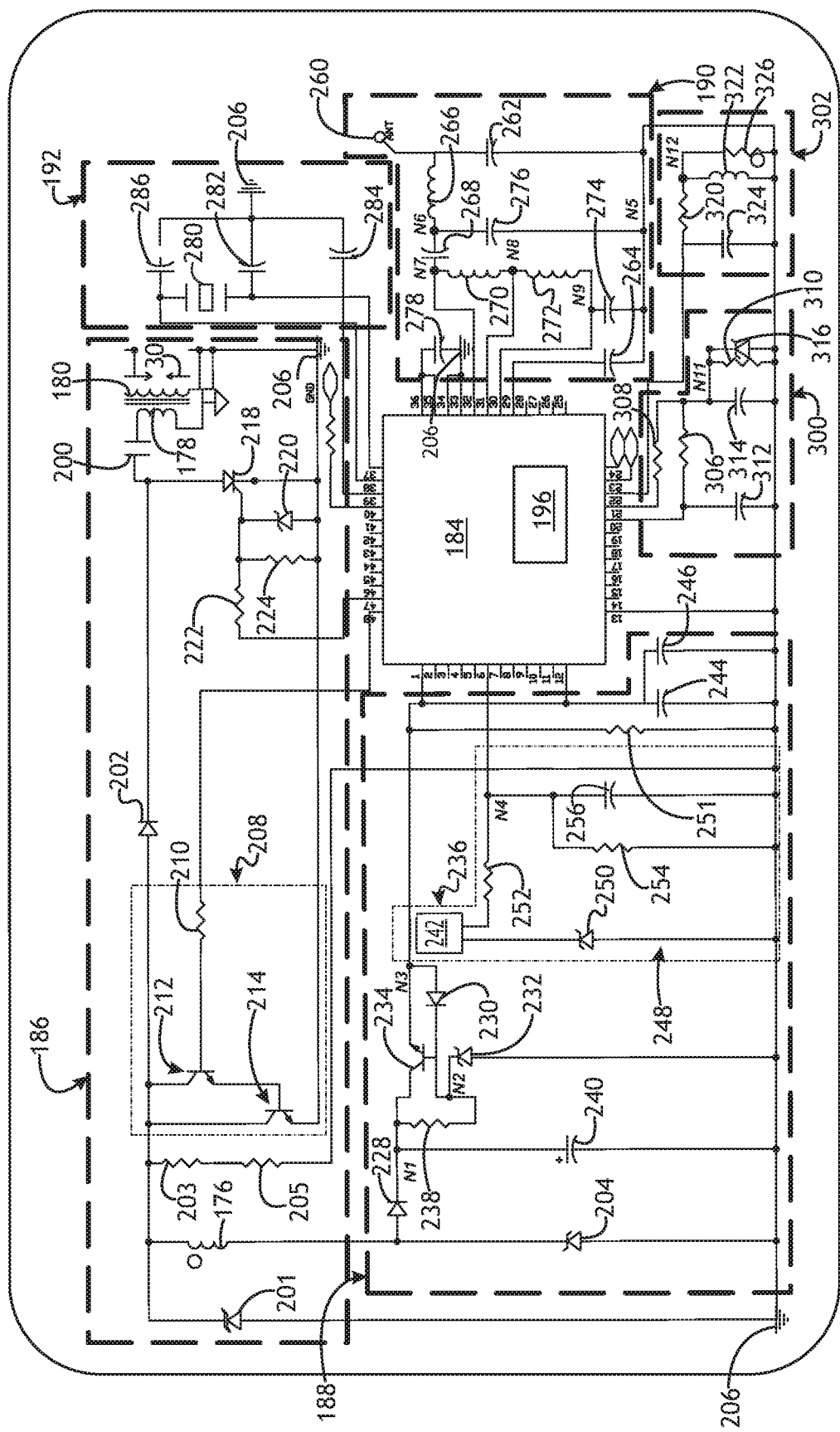
FIG. 3 is a schematic circuit diagram of a control and communication circuit that includes, among other things, a power circuit, a capacitive discharge ignition (CDD circuit, and a short range wireless communication circuit.

The microprocessor 184 (also shown in FIG. 3) may be any suitable processing device capable of executing digitally-stored instructions stored on memory 196. Memory 196 should be construed broadly to include reprogrammable or flash EEPROM (electrically erasable, programmable read-only memory), RAM (random access memory), ROM (read-only memory), EPROM (erasable, programmable read-only memory), or any other suitable non-transitory computer readable medium. In FIG. 3, the memory is shown internal to the microprocessor 184; however, this is not required (e.g., memory may be internal to chip 184, external to chip 184, or both). Non-limiting examples of instructions stored in memory 196 may include: storing a look-up table, algorithm and/or code to determine and vary the engine ignition timing relative to top dead center of the piston in the cylinder for various engine operating speeds and conditions, an algorithm to vary and control the fuel-to-air ratio of the air-and-fuel mixture supplied to the cylinder of the operating engine in response to various engine operating speeds and conditions, etc. Examples of how microcontrollers can implement ignition timing systems can be found in U.S. Pat. Nos. 7,546,836 and 7,448,358, the disclosures of which are incorporated herein by reference. In at least one embodiment, the microprocessor 184 also stores instructions associated with wireless communication and is adapted to communicate via at least one short range wireless communication protocol (e.g., including but not limited to Bluetooth Low Energy or BLE). As used herein, the term instructions should be construed broadly to include software, firmware, or any other suitable code or like set of computer-readable commands or directions.

One non-limiting commercial implementation of microprocessor 184 is the nRF51822 series microprocessor by Nordic Semiconductor (e.g., having pins 1-48). Of course, this is merely an example and other embodiments are also possible. As described more below, circuits 186-192 are coupled to and controlled by microprocessor 184. As used herein, the term "coupled" broadly encompasses all ways in which two or more electrical components, devices, circuits, etc. can be in electrical communication with one another; this includes, but is not limited to, a direct electrical connection and a connection via an intermediate component, device, circuit, etc. The circuit diagram shown in FIG. 3 is merely one example; other implementations having the same or similar functions also may be used.

According to one aspect of the control and communication circuit 182, the microcontroller 184 uses induced magneto system current to operate the CDI circuit 186 (e.g., and thereby fire spark plug 30). For example, when the magneto system 156 induces a positive current in the power charge coil 176 (e.g., a positive potential across the coil), an ignition capacitor 200 that is coupled to a first end of the coil 176 via diode 202 is charged. The other end of the power charge coil 176 may be connected to circuit ground 206 via a zener diode 204. Circuit 186 also may have overvoltage protection components associated with coil 176; these include a transient-voltage-suppression or TVS diode 201 coupled between the first end of coil 176 and ground 206, and also resistors 203, 205 collectively arranged in parallel with diode 201. Thus, a majority of the energy induced in the power charge winding 176 may be supplied to the capacitor 200 which stores this energy until the microcontroller 184 (via pin 48) changes a switch 208 to a conductive state to discharge the capacitor 200 through the primary coil 178 of the transformer which induces in the secondary coil 180 a high voltage potential which is applied to the spark plug 30 to provide a combustion initiating arc or spark.

For example, switch 208 may include a resistor 210 and two NPN transistors 212, 214 arranged in a so-called Darlington common collector arrangement or pattern. The resistor 210 may be coupled between a base of transistor 212 and pin 48 of the microprocessor 184. Each of the collectors of transistors 212, 214 may be coupled to the first end of charge coil 176, and an emitter of transistor 212 can be coupled to a base of transistor 214. The emitter of transistor 214 may be coupled to circuit ground 206 and a number of other components which enable the capacitor 200 to drain quickly—e.g., as discussed below, these components may include a thyristor 218 such as a silicon controlled rectifier (SCR), a zener diode 220, and resistors 222, 224. Thus, an enable signal sent from the microprocessor 184 via pin 48 may actuate transistor 212 thereby placing the switch 208 in the conductive state.

One end of the thyristor 218 is shown coupled to the capacitor 200, while the other end is coupled to circuit ground 206. Each of resistor 222, resistor 224, and zener diode 220 are coupled in parallel to a gate of the thyristor 218 such that when current flows through the switch 208 (more particularly, through transistors 212, 214), the gate voltage of the thyristor 218 is sufficient to actuate the thyristor 218 thereby creating a short or discharge path through the thyristor 218 from the ignition capacitor 200 to circuit ground 206. A rapid discharge of the ignition capacitor 200 causes a surge in current through the primary ignition coil 178, which in turn, creates a fast-rising electromagnetic field in the primary ignition coil. The fast-rising electromagnetic field induces a high voltage ignition pulse in the secondary ignition coil 180. The high voltage ignition pulse travels to spark plug 30 which, assuming it has the requisite voltage, provides a combustion-initiating arc or spark. Other sparking techniques, including flyback techniques, may be used instead.

As also discussed briefly above, the magneto system 156 may supply electric power to operate the microprocessor 184; this power may be managed and/or controlled by the power circuit 188. More specifically, electrical power can be provided to the microprocessor 184 during a negative phase of the magneto system 156; e.g., when the system 156 induces negative current in the power charge coil 176 (e.g., a negative potential across the coil), power is provided to pins 1 and 12 using power circuit 188. Circuit 188 may include, among other things, diodes 228, 230, a zener diode 232, an NPN transistor 234, and a kill switch circuit 236. In the illustrated arrangement, diode 228 is coupled between the second end of charge coil winding 176 and a node N1 (or a collector of transistor 234). Node N1 is also coupled to node N2 (a base of transistor 234) via resistor 238, and node N1 further is coupled to circuit ground 206 via capacitor 240. The diode 230 is coupled between the node N2 (base of transistor 234) and node N3 (emitter of transistor 234)—e.g., directing current toward the emitter. Zener diode 232 is coupled between node N2 and circuit ground 206, and node N3 further is coupled to pins 1 and 12 (input voltage pins of microprocessor 184) thereby powering the processor 184 using the negative portion of the AC signal generated by coil 176. In the illustrated circuit, pins 1 and 12 are coupled to ground 206 via resistor 251, capacitor 244, and capacitor 246 (wherein each of elements 251, 244, 246 can be arranged in parallel with one another).

In the illustrated kill switch circuit 236, the kill switch 242 is coupled to circuit ground 206 via a zener diode 250 (which protects against voltage transients coming in on the kill terminal), and the switch 242 is coupled to node N4 (pin 6 of the microprocessor 184) via a resistor 252. Node N4 is coupled to ground 206 via resistor 254 and capacitor 256 (which are arranged in parallel). Preferably once an engine revolution, or at some desired time interval, a kill activation check or subroutine may be performed (in at least one implementation, such as that shown in FIG. 3, the subroutine or check takes about 50-100 p to perform). The kill activation check starts with setting pin 6 on the microprocessor 184 to an output and letting that charge up capacitor 256 close to Vcc of the processor. Then pin 6 is changed to an input, and after some time (in one implementation it is about 50-100 p), the voltage at pin 6 is measured. The voltage level at pin 6 at that instance determines if the kill switch has been activated or not. The capacitor 256 will normally discharge via resistor 254 at a certain rate. When the kill switch is activated (e.g. the user holds the button or switch closed), the capacitor will discharge more quickly as now resistor 252 is in parallel with resistor 254 as the discharge path. Thus, the voltage at pin 6, which is a function of the capacitor discharge rate (i.e. a quicker discharge rate will result in a lower voltage level), can be used to determine if a kill switch activation has occurred.

The short range wireless communication circuit 190 may be coupled to microprocessor 184 via pins 29-36 and generally may be adapted to send and receive wireless transmissions via a short range wireless antenna 260 (e.g., which may be a flat or embedded antenna—e.g., comprising a wire or trace etched within circuit card 183). In the illustrated embodiment, the antenna 260 is coupled to node N5 via capacitor 262, and node N5 is coupled to pin 29 via capacitor 264. In addition, antenna 260 is coupled to node N6 via inductor 266, and node N6 is coupled to node N7 (pin 32) via capacitor 268. Nodes N7 (pin32) and N8 (pin 31) are coupled to one another via inductor 270, and node N8 (pin 31) and node N9 (pin 30) are coupled to one another via inductor 272. Capacitor 274 couples nodes N5 and N9, and capacitor 276 couples nodes N5 and N6. Pins 33 and 34 may be coupled to ground 206, and pins 35-36 may be coupled to ground 206 via capacitor 278. Circuit elements 262, 266, 268, 270, 272 and 276 comprise a balance filter circuit adapted to match impedance of the antenna for suitable communication performance. Other implementations also exist (e.g., using a balun or other integrated circuit technology). Together, the microprocessor 184 and circuit 190 may be adapted to receive and transmit signals via any suitable short range wireless frequency or communication protocol; according to at least one embodiment, the circuit 190 (and antenna 260) are adapted to communicate via Bluetooth Low Energy (BLE) frequencies (~2.4 GHz).

Skilled artisans will appreciate that the repetitive charging and discharging of ignition capacitor 200 may generate undesirable electromagnetic frequencies and potential electromagnetic interferences which may interfere with the short range wireless communications conducted using circuit 190. For example, at least a portion of the antenna 260 may be within an inch of the ignition capacitor 200 (e.g., draining 30 kV of charge, sufficient to trigger spark at plug 30). Furthermore, as discussed above, both the CDI circuit 186 and antenna circuit 190 may be located on the same face or side of circuit card 183. Thus, the present control and communication circuit 182 has been configured to establish electromagnetic compatibility of BLE and other short range wireless transmission signals in this noisy ignition circuit environment—including, e.g., the use of multiple ground planes (e.g., one or more analog ground planes and one or more digital ground planes), filtering capacitors, and component layout or arrangement on printed circuit board 183.

Clocking circuit 192 may include a crystal oscillator 280 (one end coupled to pin 37 and the other end to pin 38 of microprocessor 184). Crystal oscillations may provide a precise clocking frequency to processor 184 which may be used to facilitate BLE communication, as well as to improve ignition timing (e.g., firing of the spark plug 30). For example, the output of the clocking circuit 192 may be used by the microprocessor 184 to more precisely determine engine speed (e.g. RPMs) which in turn can be used to calculate when to discharge capacitor 200 and fire spark plug 30. Thus, in at least one embodiment, the clocking circuit 192 is adapted to serve dual purposes. Pin 37 further may be coupled to ground 206 via capacitor 282, pin 39 may be coupled to ground 206 via capacitor 284, and pin 38 also may be coupled to ground 206 via capacitor 286. In at least one embodiment, the oscillator 280 provides a clocking frequency of 16 MHz.

In at least some implementations, the control and communication circuit 182 also could include a programming or data circuit 300 and a speed measuring circuit 302. The programming circuit 300 may enable configuration changes to microprocessor instructions or algorithms, and the circuit 300 may include resistors 306-310, capacitors 312, 314, and a zener diode 316. For example, pin 20 may be coupled to ground 206 via capacitor 312; further pin 20 may be coupled to node N11 via resistor 306, and node N11 may be coupled to ground 206 via capacitor 314, resistor 310, and/or diode 316 (each of which are arranged in parallel between node N11 and ground 206). Resistor 308 couples pin 21 to node N11. Node N11 (and circuit ground 206) may be used as a connection point to program the microprocessor 184 using an external computer or computing device. The external computer may communicate with circuit 300 while the engine is operating. Or the external computer may communicate with circuit 300 (and microprocessor 184) using an external power source that may be electrically coupled to the circuit 182.

Speed and position measuring circuit 302 may provide an analog trigger signal for providing the microprocessor 184 with a revolution speed and position (e.g., associated with the magneto system 156). For example, the analog trigger signal may be used to calculate engine timing calculations. For example, pin 22 may be coupled to an RLC circuit (having within one current loop a resistor 320, a coil 322, and a capacitor 324)—e.g., coil 322 may be located on lamstack 170 (which is shown in FIG. 2). Both coil 322 and capacitor 324 may be coupled to ground 206, and capacitor 324 and resistor 320 may be tied to pin 22. Circuit 302 also illustrates another resistor 326 coupled between a node N12 and ground 206 (e.g., in parallel with coil 322 for noise reduction and/or signal stability). Pins 23-24 also may be tied to external clocking inputs or circuits (not shown); and pin 13 may be tied to ground 206. Thus, circuit 302 may provide analog revolution data to the microprocessor 184 based on a sensed position of the flywheel 26. It should be appreciated that circuits 300 and 302 are optional.

Using control and communication circuit 182, a number of services or functionalities 400 may be carried out between the control and communication module 28 and a mobile device 150 (see FIG. 2), or between the mobile device and a remote or backend server 350. The mobile device 150 may include a processor 352 and a non-transitory computer readable medium embodied as memory 354, wherein the memory 354 may store program instructions (e.g., application software) executable by the processor 352 to carry out at least a portion of the method and operations described herein. The mobile device 150 may be adapted to communicate (410) securely by wire and/or wirelessly with the server 350 via the internet 356; in some instances, device 150 communicates via short range (e.g., Wi-Fi, Bluetooth, etc.) and/or cellular (LTE, CDMA, etc.) communications in addition to using an internet connection. Non-limiting examples of mobile devices include: a smartphone, a wireless tablet or notebook having two-way communication capability, a handheld engine diagnostic tool, or other suitable portable computing device.

For example, using the software application, a user of the mobile device 150 may register (420) the trimmer 10 and any other small engine devices also owned by the user (e.g., such as a blower, a lawn mower, etc.) with the server 350. This may include creating a user account via the mobile device application software and thereafter linking a suitable identifier (e.g., a model number, a serial number, a nickname identifier, etc.) of each small engine device with the user's account. Of course, in some instances, the user may use a web portal from another connected computer to create or access the account at the server 350 and later access the updated account via the mobile device 150. Having registered the trimmer device 10, the user also may use the application software to view owner's manual and/or service information associated with the trimmer 10 (or other registered devices). Similarly, the trimmer manufacturer may provide rebate, coupon, service information, etc. to the user via the application software.

The application software on device 150 may be used to receive, analyze, and/or display diagnostics data associated with the trimmer 10 as well (430). For example, using a BLE link or communication connection between the communication circuit 182 and mobile device 150, the mobile device may receive various diagnostic trimmer data. Non-limiting examples include total run time/hours of the trimmer 10, run time of the trimmer's current ignition session, engine temperature, hours since previous oil change, hours since previous air filter change, hours since previous spark plug change, a locked or unlocked engine status (as discussed more below), etc. The mobile device 150 may store this information and periodically transmit at least some of it to the backend server 350; there it may be compiled with other data from other units (e.g., from other respective connected mobile devices) and used to improve trimmer performance and the user experience. The application software may be used to set or reset various counters as well (e.g., an oil change counter, an air filter usage counter, a spark plug life counter, etc.).

Further, application software on device 150 may be used to program or reflash the microprocessor 184 (or memory 196) on trimmer 10 (440). For example, instead of (or in addition to) programming the microprocessor 184 via a physical electrical connection to circuit 300, the mobile device 150 via BLE may transmit a program update or system configuration change—thereby enabling a wireless programming of microprocessor 184. According to one embodiment, the application software may display a prompt on the mobile device 150—and when the engine 12 of trimmer 10 is running and the prompt is selected, the application software may connect to the microprocessor 184 and short range wireless communication circuit 190 and download the update to the processor memory 196. Thereafter, the microprocessor 184 may be configured to install the update. In this manner, the update largely may be automated and occur with minimal user interaction.

According to one alternative programming or reflash method, the microprocessor 184 or memory thereof may be reflashed without the engine 12 running. For example, an external power source may be coupled to the control and communication circuit 182, which may sufficiently power the circuit during the reflash event. And in at least one additional embodiment, the trimmer 10 may include an onboard power source or battery that may be used to carry out BLE communications (including reflash procedures) between the mobile device and circuit 182 when the engine 12 is not running. In at least some implementations, the battery or other power source does not power the ignition circuit which would be powered by the magnet power generation arrangement already described.

The mobile device 150—and the application software thereon—also may be configured to remotely lock or unlock trimmer functionalities (450). For example, according to one embodiment, the microprocessor 184 may inhibit spindle rotation of the trimmer 10 (or other functionality) until it receives an unlock signal from the mobile device via BLE communication. Further, in the unlocked position, the user of the mobile application wirelessly may send a lock signal to the microprocessor 184 and communication circuit 190— and one or more trimmer functionalities may be locked in response to the receipt thereof. Locking and unlocking of the trimmer 10 via the BLE link may require the user to provide authenticating information (e.g., a fingerprint, a code, etc.). Thus, feature 450 may discourage theft and unauthorized use of the trimmer 10—e.g., if the unauthorized user is unable to operate the trimmer 10 or trimmer features, it is less likely to be stolen or the like. According to another embodiment, a lock code is requested via the mobile device application at the time of trimmer start-up; and if the lock code is not received within a predetermined period of time, the microprocessor 184 inhibits at least one (or all) trimmer functionalities.

According to another aspect of mobile device application software, the operation of the trimmer 10 may be inhibited based on the trimmer's geographic location (460). For example, the user—via the application software—may set geo-boundaries (or geo-parameters) defining a region or location wherein the trimmer 10 may be used (e.g., used without a lock code). Provided the trimmer 10 is used within the predetermined region (or within a preset distance of that location), the trimmer is operable. However, if the trimmer 10 is used outside that geo-boundary (or outside of the preset distance), at least one trimmer functionality is inhibited. Thus, the mobile device 150 may utilize data from a GPS chipset within the mobile device to determine whether it is presently located within the user-defined boundaries (since BLE communication links are relatively short in range, it may be presumed by the mobile device 150 that the trimmer 10 is nearby if the device 150 is engaged in a current BLE session). According to an alternative embodiment, when the trimmer 10 is determined by the mobile device 150 to be located outside of that geo-boundary, the microprocessor 184 is configured to shut down the trimmer 10 unless it receives the unlock code from the mobile device 150 (via BLE) within a predetermined period of time. Thus, the use of pre-programmed geo-boundaries may be another theft deterrent feature—as the thief may be deterred from stealing a trimmer that is not ultimately usable or inoperable.

According to another aspect of mobile device application software, the microprocessor 184 and short range wireless communication circuit 190 may be used to communicate with other wired or wireless devices on the weed trimmer 10 (470). For example, if another BLE transceiver were located elsewhere on the trimmer 10, the circuit 190 could be used to send and receive data therebetween. Or for example, another electrical device or circuit on trimmer 10 may be wired to the microprocessor 184 and/or circuit 190—and the processor 184 and circuit 190 may behave or function as a bridge or gateway between such devices/circuits and a wirelessly connected device not on-board the trimmer 10 (e.g., such as mobile device 150 or the like). This may be particularly helpful in power tool embodiments having electronic components located remotely from one another— such as a weed trimmer which may have electronic switches and user controls spaced from the engine 12.

Thus, there has been described a control and communication module for a power tool or product having a light-duty combustion engine and a control and communication circuit with both an ignition circuit and a short range wireless communication circuit. The circuit can be controlled by a microprocessor which controls engine ignition timing and as well as short range wireless communication between it and a connected mobile device. The ignition control circuit and communication circuit may be located on the same circuit board, or they may be located on separate circuit boards, as desired. Further, a microprocessor used for one or both of the ignition control circuit and the communication circuit may be located on the same circuit board as these circuits, on the same board as one of the circuits, or on a separate circuit board remote from the board on which one or both of the circuits are located.

In at least some implementations, a control and communication system for a light-duty combustion engine includes at least one microprocessor, an ignition circuit communicated with the at least one microprocessor and configured to control an ignition timing of the engine and to provide energy used for ignition events, and a short range wireless communication circuit. The communication circuit is communicated with the at least one microprocessor to enable operation of the communication circuit. In at least some implementations both the ignition circuit and the communication circuit are located on the same circuit board. In at least some implementations, the ignition circuit and communication circuit are located on different circuit boards and at least one of the at least one microprocessor is on the same circuit board as either the ignition circuit or the communication circuit. In at least some implementations, the at least one microprocessor includes a first microprocessor located on a first circuit board and a second microprocessor located on a second circuit board, and wherein the ignition circuit is located on the first circuit board and communicates with and is controlled by the first microprocessor, and the communication circuit is located on the second circuit board and communicated with and is controlled by the second microprocessor. One or more wired connections may exist between the circuits and circuit boards with wireless and/or wired communication to a device outside of the product having the engine (e.g. computer, smart phone, diagnostic device/tool, etc.), or vice versa.

In at least some implementations, the second microprocessor may be used to control other engine operations, such as (but not limited to) a valve used to alter a fuel to air ratio of a fuel and air mixture delivered to the engine. In other words, in that example, the second microprocessor may control the movement of the valve (e.g. opening and closing of a solenoid actuated valve), and such movement of the valve may change the fuel and air mixture delivered to the engine. Of course, other processors or controllers may be used with the engine, for example, a remote kill switch may be located on a circuit board that is remote from the engine and that circuit board may include a microprocessor and the communication circuit. Of course, other examples may be used.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A control and communication system for a light-duty combustion engine, comprising:
   a circuit card;
   an ignition circuit carried by the circuit card and configured to control an ignition timing of the engine, wherein the ignition circuit includes an ignition capacitor that when discharged induces an ignition pulse adapted to fire a spark plug, and the ignition circuit includes a switch that controls discharge of the ignition capacitor; and
   a short range wireless communication circuit carried by the circuit card.

2. The system of claim 1, wherein the communication circuit includes a Bluetooth Low Energy antenna.

3. The system of claim 1, wherein the ignition circuit includes a transistor coupled to the switch, and the transistor is arranged so that when the transistor is actuated, the switch is placed in a conductive state to discharge the ignition capacitor.

4. The system of claim 1, further comprising a microprocessor that is coupled to and controls the ignition and communication circuits wherein the microprocessor controls that state of the switch.

5. The system of claim 1, further comprising a clocking circuit adapted to provide a clocking frequency associated with the timing of the ignition circuit and associated with the communication circuit via a short range wireless communication protocol.

6. The system of claim 5 wherein the clocking circuit includes a crystal oscillator.

7. The system of claim 2 wherein at least a portion of the antenna is within an inch of the ignition capacitor.

8. The system of claim 7 wherein the communication circuit includes multiple ground planes including one or more analog ground planes and one or more digital ground planes.

9. A control and communication system for a light-duty combustion engine, comprising:
   at least one microprocessor;
   a capacitive discharge ignition circuit communicated with the at least one microprocessor, wherein the at least one microprocessor controls an ignition timing of the engine and the ignition circuit provides energy used for ignition events; and
   a short range wireless communication circuit communicated with the at least one microprocessor which controls operation of the communication circuit, and wherein the ignition circuit provides power to the communication circuit for operation of the communication circuit, and wherein the ignition circuit is located on a circuit board and the communication circuit is located on the same circuit board as the ignition circuit.

10. The system of claim 9 wherein the ignition circuit provides power for operation of the at least one microprocessor.

11. The system of claim 10 wherein the ignition circuit includes a power circuit that provides power to the at least one microprocessor and to the communication circuit and wherein the ignition circuit includes multiple coils in which an AC power signal is induced, and wherein the ignition circuit includes a charge capacitor that when discharged causes an ignition event, and wherein the charge capacitor is charged by one portion of the AC signal and the power circuit is charged by a different portion of the AC signal.

12. The system of claim 11 wherein said one portion is a positive portion of the AC signal and said different portion is a negative portion of the AC signal.

13. The system of claim 9, wherein the communication circuit includes a Bluetooth Low Energy antenna.

14. The system of claim 9, wherein the ignition circuit includes an ignition capacitor that when drained induces an ignition pulse adapted to fire a spark plug.

15. The system of claim 9, further comprising a clocking circuit adapted to provide a clocking frequency associated with the timing of the ignition circuit and associated with the communication circuit via a short range wireless communication protocol.

16. The system of claim 15 wherein the clocking circuit includes a crystal oscillator.

17. The system of claim 13 wherein the ignition circuit includes an ignition capacitor that when drained induces an ignition pulse adapted to fire a spark plug, and wherein at least a portion of the antenna is within an inch of the ignition capacitor.

* * * * *